(12) United States Patent
Holmes (10) Patent No.: US 11,154,043 B2
(45) Date of Patent: Oct. 26, 2021

(54) PROTECTIVE DEVICE FOR FISHING RODS FOR USE ON FISHING VESSELS

(71) Applicant: David Scott Holmes, Alameda, CA (US)

(72) Inventor: David Scott Holmes, Alameda, CA (US)

(73) Assignee: Imodify Outdoors Co., Pleasanton, CA (US)

( * ) Notice: Subject to any disclaimer, the term of this patent is extended or adjusted under 35 U.S.C. 154(b) by 232 days.

(21) Appl. No.: 15/586,172

(22) Filed: May 3, 2017

(65) Prior Publication Data
US 2017/0318794 A1   Nov. 9, 2017

Related U.S. Application Data

(60) Provisional application No. 62/331,330, filed on May 3, 2016.

(51) Int. Cl.
| | | |
|---|---|---|
| *A01K 97/08* | (2006.01) | |
| *A01K 97/10* | (2006.01) | |
| *B63B 35/16* | (2006.01) | |

(52) U.S. Cl.
CPC ............. *A01K 97/08* (2013.01); *A01K 97/10* (2013.01); *B63B 35/16* (2013.01)

(58) Field of Classification Search
CPC ......... A01K 97/10; A01K 97/08; B63B 35/16
USPC .................. 43/21.2, 26; 224/922, 400–406; 114/255, 364, 78, 85, 116; 211/70.8, 211/70.1
See application file for complete search history.

(56) References Cited

U.S. PATENT DOCUMENTS

| | | | | |
|---|---|---|---|---|
| 941,779 | A * | 11/1909 | Hodgkins ............. | E05B 69/006 211/8 |
| 1,816,334 | A * | 7/1931 | Matthews ............. | B63H 16/06 211/8 |
| 2,497,797 | A * | 2/1950 | Rogers ................. | E05B 73/007 114/363 |
| 2,536,797 | A * | 1/1951 | Cooke ................... | B60R 9/08 224/568 |
| 2,721,680 | A * | 10/1955 | Steckman ............. | B60R 5/006 224/275 |
| 2,931,056 | A * | 4/1960 | De Muro .............. | B63B 17/00 114/363 |
| 3,146,889 | A * | 9/1964 | Franco ................. | A63D 15/10 211/68 |
| 3,291,427 | A * | 12/1966 | Hutchings ........... | A47B 81/005 248/201 |
| 3,406,930 | A * | 10/1968 | Seiler ................... | B64D 9/00 244/118.1 |
| 3,487,947 | A * | 1/1970 | Bogar, Jr. ............. | A01K 97/08 211/70.8 |

(Continued)

*Primary Examiner* — Darren W Ark
(74) *Attorney, Agent, or Firm* — Jennifer Hayes; Nixon Peabody LLP (57) ABSTRACT

A fishing rod shield for use on a fishing vessel. The fishing rod shield protects fishing rods while also providing improved safety to the fishing vessel. The fishing rod shield includes a rod protector and a cover positioned over the rod protector. The rod protector includes a plurality of openings through which a fishing rod may be at least partially inserted and easily removed. The shield includes an anti-slip or other safety surface to provide improved safety on the fishing vessel.

11 Claims, 5 Drawing Sheets

(56) References Cited

U.S. PATENT DOCUMENTS

| | | | | |
|---|---|---|---|---|
| 3,672,513 | A * | 6/1972 | Riddle | A01K 97/08 211/70.8 |
| 3,731,817 | A * | 5/1973 | Fowlkes | A01K 97/08 211/70.8 |
| 3,834,340 | A * | 9/1974 | Thorpe | B63B 1/04 114/201 R |
| 3,876,076 | A * | 4/1975 | Hazelhurst | A01K 97/08 211/4 |
| 4,006,825 | A * | 2/1977 | Austin | A01K 97/08 211/70.8 |
| 4,109,796 | A * | 8/1978 | Mitchell | A01K 97/08 211/70.8 |
| 4,129,911 | A * | 12/1978 | McDonald | B63B 35/7906 441/74 |
| 4,132,381 | A * | 1/1979 | McClellan | A01K 97/00 211/70.8 |
| 4,161,795 | A * | 7/1979 | Quest | B63B 27/14 114/362 |
| 4,170,801 | A * | 10/1979 | Ward | A01K 97/08 114/343 |
| 4,424,907 | A * | 1/1984 | Robb | A47B 81/005 211/118 |
| 4,523,704 | A * | 6/1985 | Washington | B60R 9/055 224/328 |
| 4,571,195 | A * | 2/1986 | Brooks, Jr. | B63B 35/811 280/14.21 |
| 4,582,203 | A * | 4/1986 | Davis | A01K 97/10 211/60.1 |
| 4,662,303 | A * | 5/1987 | Duff | B63B 35/14 114/343 |
| 4,671,009 | A * | 6/1987 | Faunce | A01K 97/00 211/181.1 |
| 4,737,390 | A * | 4/1988 | Fricano | A47G 23/06 428/34.2 |
| 4,770,327 | A * | 9/1988 | Fortson | A01K 97/06 220/533 |
| 4,856,221 | A * | 8/1989 | Thompson | A01K 97/10 43/21.2 |
| 4,961,505 | A * | 10/1990 | Moeller | A47F 7/0035 211/65 |
| 4,974,537 | A * | 12/1990 | Martin | A01K 97/10 114/255 |
| 5,048,447 | A * | 9/1991 | Vicari | A01K 97/06 114/255 |
| 5,127,355 | A * | 7/1992 | Magers | A01K 97/08 114/255 |
| 5,307,585 | A * | 5/1994 | Thompson | A01K 97/10 211/70.7 |
| 5,586,515 | A * | 12/1996 | Nickles | A01K 97/08 114/255 |
| 5,975,002 | A * | 11/1999 | Rieger | B63B 35/14 114/343 |
| 5,979,102 | A * | 11/1999 | Sagryn | A01K 97/08 114/364 |
| 6,109,459 | A * | 8/2000 | Downey | A47B 81/005 211/70.8 |
| 6,186,087 | B1 * | 2/2001 | Vinas | B63B 25/002 114/343 |
| 6,273,020 | B1 * | 8/2001 | D'Alessandro | B63B 17/00 114/364 |
| 6,367,403 | B1 * | 4/2002 | Carter | A01K 97/06 114/343 |
| 6,415,733 | B1 * | 7/2002 | Hudson | B63B 25/002 114/343 |
| 6,574,911 | B1 * | 6/2003 | Hurst | A01K 97/06 114/343 |
| D486,779 | S * | 2/2004 | Alberti | D12/406 |
| 6,880,480 | B2 * | 4/2005 | Clouse | A01K 97/06 114/343 |
| 7,165,703 | B1 * | 1/2007 | Howe | B63B 25/002 211/70.8 |
| D537,771 | S * | 3/2007 | Pflieger | D12/406 |
| 7,322,149 | B1 * | 1/2008 | Quintero | A01K 97/08 206/315.11 |
| 7,591,228 | B2 * | 9/2009 | Hopper | E05C 3/06 114/116 |
| 8,672,719 | B2 * | 3/2014 | Grimes | B63B 35/73 114/364 |
| 9,611,015 | B1 * | 4/2017 | Borg | B63B 35/7906 |
| 10,542,738 | B2 * | 1/2020 | Moses | A47B 81/005 |
| 2003/0041503 | A1 * | 3/2003 | Marjerison | A01K 97/01 43/54.1 |
| 2005/0204983 | A1 * | 9/2005 | Dykes | B63B 25/002 114/78 |
| 2006/0070292 | A1 * | 4/2006 | Fitzgerald | A01K 97/06 43/54.1 |
| 2007/0169396 | A1 * | 7/2007 | O'Neill | A01K 97/08 43/21.2 |
| 2015/0336634 | A1 * | 11/2015 | Swan | B63B 7/085 114/345 |
| 2016/0362041 | A1 * | 12/2016 | DeJong | B60P 7/0815 |
| 2018/0265013 | A1 * | 9/2018 | Beznes | B60R 9/08 |

\* cited by examiner

PROTECTIVE DEVICE FOR FISHING RODS FOR USE ON FISHING VESSELS

CROSS-REFERENCE TO RELATED APPLICATIONS

The present application claims priority to U.S. Provisional Application No. 62/331,330, filed May 3, 2016, entitled "Protective Device for Fishing Rods for Use on Fishing Vessels," the entirety of which is hereby incorporated by reference.

FIELD

The present invention is related to a rod stomp shield for use in a fishing vessel.

BACKGROUND

Fishing is a popular recreational and competitive activity; however, it can be dangerous. Fisherman are at risk of slipping on the boat and falling into the water or tripping or falling on the boat, and can suffer serious injuries or death, as a result. The fishing rods used to fish can be very expensive and can be damaged if not properly stored on the fishing vessel. Additionally, in competitive fishing, especially competitive bass angling, it is important that fisherman have quick and easy access to their fishing rods. However, current fishing vessels and components do not provide adequate protection for the fishing rods that also allow easy access to the rods and do not provide sufficient safety to fisherman.

SUMMARY

Embodiments of the invention relate to protective devices for fishing rods that provide improved safety to fisherman and other occupants of fishing vessels. The protective devices have particular advantages for competitive fishing. According to one aspect of the invention, a protective device for fishing rods includes a rod protector and a shield cover positioned over the rod protector. The rod protector includes one or more openings—the fishing rods can be at least partially positioned in the openings and can be easily withdrawn from the openings. The shield cover includes a safety surface, such as an anti-slip or other similar safety surface. Embodiments of the invention also relate to the use of the protective devices for fishing rods and fishing vessels that include the protective devices.

Additional aspects of the present invention will be apparent in view of the description which follows.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Embodiments of the present invention are described herein in the context of a method, system and apparatus for shielding fishing rods for use on fishing vessels. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
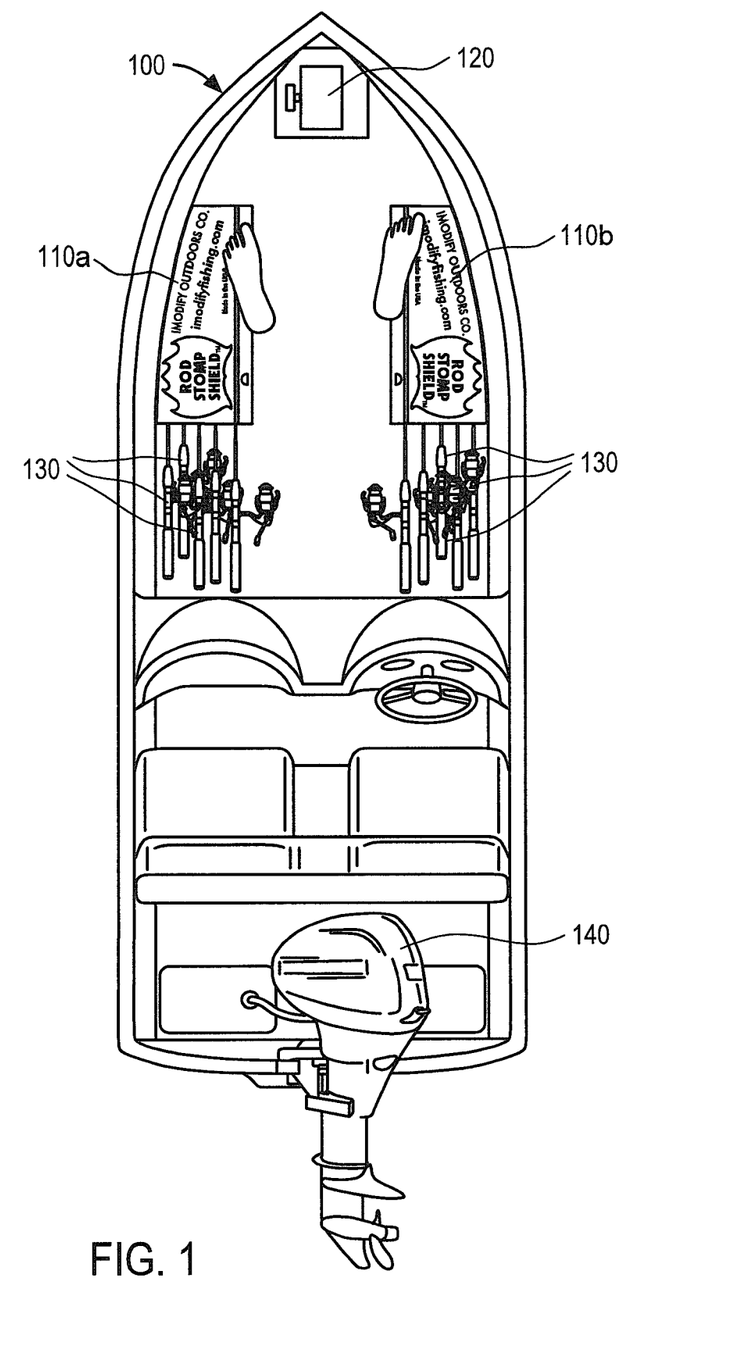
FIG. 1 is a schematic diagram of a fishing vessel having a rod stomp shield according to one embodiment of the invention.

An embodiment of the invention will now be described in detail with reference to FIG. 1. FIG. 1 illustrates a fishing vessel 100 having two rod stomp shields 110a, 110b, according to some embodiments of the invention. The rod stomp shields 110a, 110b are positioned on the left and right sides of the fishing vessel 100 near the trolling motor pedal 120. As shown in FIG. 1, five fishing rods 130 are positioned in each of the rod stomp shields 110a, 110b. It will be appreciated that fewer than five fishing rods or more than five fishing rods may be positioned in each of the rod stomp shields. It will also be appreciated that one rod stomp shield 110 or more than two rod stomp shields may be used on the fishing vessel 100.

The fishing vessel 100 may be any boat or aquatic vehicle used for fishing. Although the fishing vessel 100 is illustrated as including an outboard motor 140 and a trolling motor pedal 120, it will be appreciated that the fishing vessel 100 is not required to include a motor or trolling motor pedal; it will also be appreciated that the outboard motor 140 and trolling motor pedal 120 may be positioned in different locations than that pictured in FIG. 1. In one embodiment, the fishing vessel 100 is a bass fishing boat.

In use, at least one rod stomp shield 110 is positioned on the fishing vessel 100. As shown in FIG. 1, a first rod stomp shield 110 is positioned on a left, front side of the fishing vessel 100, and a second rod stomp shield is positioned on a right, front side of the fishing vessel 100. An operator of the fishing vessel or an occupant of the fishing vessel (or both) may insert one or more fishing rods 130 into the at least one rod stomp shield 110. The one or more fishing rods 130 may be easily withdrawn from the rod stomp shield(s) 110 when needed.

The rod stomp shield 110 provides several advantages. First, it protects fishing rods from damage. Second, the fishing rods can be quickly and easily withdrawn from the rod stomp shield. Third, fisherman or other occupants or operators of the fishing vessel can stand on the rod stomp shield. Because the rod stomp shield is configured to resist slipping, it provides a safety advantage to those individuals. Fourth, the rod stomp shield 110 provides increased workspace on the fishing vessel 100 by covering the rods, resulting in more room to perform fishing functions, which also contributes to the safety factor by not having expensive rods in the way (which in the past were often tripped over).

Figure 2:
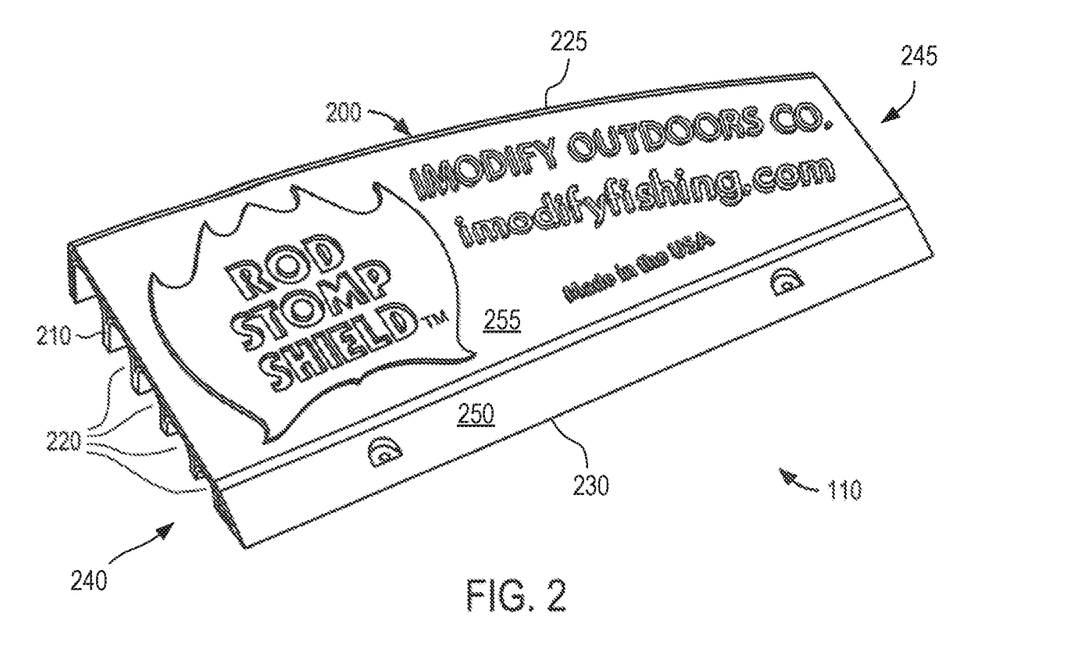
FIG. 2 is a perspective view of a rod stomp shield according to one embodiment of the invention.

FIG. 2 illustrates the rod stomp shield 110 in further detail. The rod stomp shield 110 includes a shield cover 200 and a rod protector 210. The shield cover 200 is positioned over the rod protector 210 and is configured such that a fisherman or other occupant of the fishing vessel can stand or otherwise place their foot on the rod stomp shield 110 without slipping. In one embodiment, the shield cover 200 includes an anti-slip surface, a quick-dry surface, or other similar surface to reduce or prevent slipping. As shown in FIG. 2, the rod protector 210 includes a plurality of openings 220 for receiving fishing rods. In FIG. 2, the rod protector 210 includes five openings; however, it will be appreciated that the rod protector 210 may have fewer than or more than five openings 220. Although the rod stomp shield is illustrated as having two separate components (the shield cover 200 and rod protector 210), it will be appreciated that the shield cover 200 and rod protector 210 can be integral with one another so that there is only one component to the rod stomp shield 110 that both protects the fishing rods and provides a safety surface that reduces or prevents slipping.

In embodiments where the rod stomp shield 110 includes two separate components as shown in FIG. 2, the shield cover 200 is sized so that its interior dimensions will fit snugly with the rod protector 210. In some embodiments, the shield cover 200 will have an interference fit with the rod protector 210. The shield cover 200 and rod protector 210 may also be in a locked relationship with one another using any known mechanical techniques known to persons of skill in the art such as screws, bolts, fasteners, and the like. In some embodiments, the shield cover 200 will be releasably locked to the rod protector 210.

As shown in FIG. 2, the perimeter of the rod stomp shield 110 is may be configured to have a curved outer face 225 and a straight inner face 230. In an alternative embodiment, both the outer face 225 and the inner face 230 may be curved, and a circumferential dimension of the curved outer surface is larger than its inner dimension than the circumferential dimension of the curved inner surface. In either embodiment, the curved outer face 225 may be designed such that the rod stomp shield 110 is configured to match the curvature of the fishing vessel (e.g., the curved outer face has a similar curvature as the curvature of the portion of the fishing vessel where the rod stomp shield will be located). The width of the rod stomp shield 110 at one end 240 may be greater than the width at the other end 245. In FIG. 2, the rod stomp shield 110 is taller at one end and shorter at one end in a longitudinal direction and the rod stomp shield 110 is also taller at one end and shorter at the other end a latitudinal direction; it will be appreciated that the variation in height may be different from that shown in FIG. 2. It will be further appreciated that in one embodiment, the height of the rod stomp shield 110 may be the same throughout; alternatively, the height may only vary from end to end in the longitudinal direction or in the latitudinal direction; however, providing the variation in height can provide safety advantages by reducing the risk of tripping.

In embodiments where the rod stomp shield is positioned at the front of the fishing vessel as shown in FIG. 1, the rod stomp shield 110 is positioned in the fishing vessel such that the taller end of the rod stomp shield 110 is positioned near the exterior of the fishing vessel, and the shorter end of the rod stomp shield 110 is positioned near the front of the fishing vessel such that the rod stomp shield provides a sloped surface from the interior of the fishing vessel to the exterior of the fishing vessel. In some embodiments, as shown in FIG. 2, the rod stomp shield 110 may have two sloped surfaces 250, 255. In FIG. 2, the first sloped surface 250 has a steepness greater than the second sloped surface 255. It will be appreciated that in alternative embodiments the rod stomp shield 110 may have a single sloped surface or more than two sloped surfaces. It will be appreciated that in alternative embodiments, the fishing rod stomp shield may be the same height from end to end, the same length and/or the same width.

In some embodiments, both the shield cover 200 and the rod protector 210 are both made of molded plastic. It will be appreciated that other materials can be used to make the shield cover 200 and the rod protector 210 and that the shield cover 200 can be made of a different material than the rod protector 210.

Figure 3:
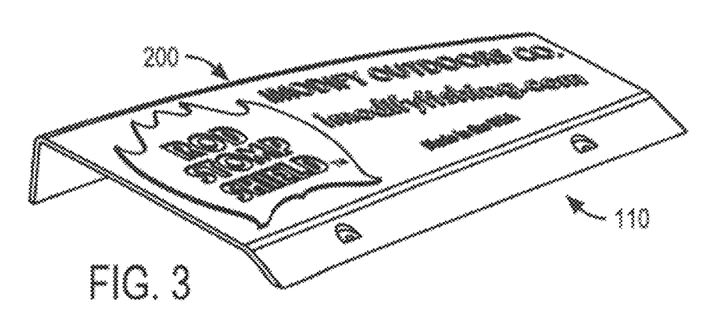
FIG. 3 is a perspective view of a rod stomp shield cover according to one embodiment of the invention.
Figures 3A, 3B, 3F:
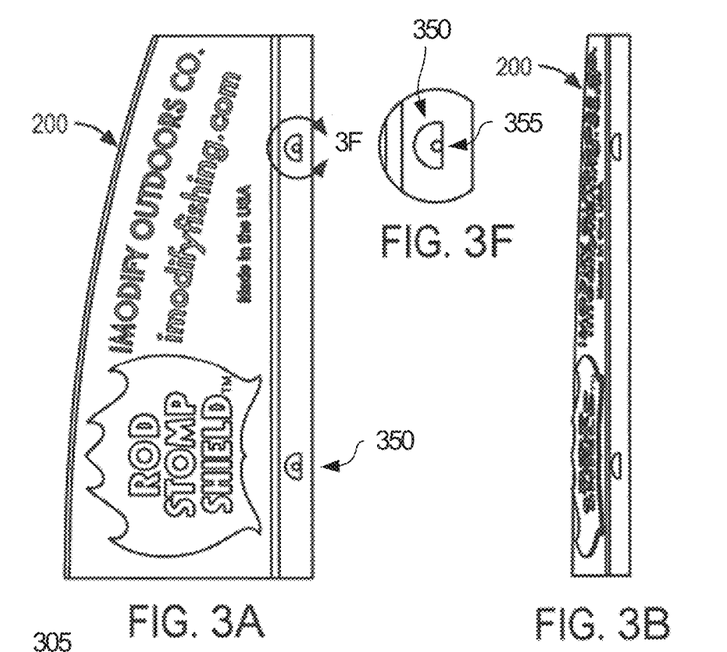
FIG. 3A is a top view of the rod stomp shield cover of FIG. 3 according to one embodiment of the invention.
FIG. 3B is a front view of the rod stomp shield cover of FIG. 3 according to one embodiment of the invention.
FIG. 3F is a detailed view of FIG. 3A according to one embodiment of the invention.
Figure 3C:
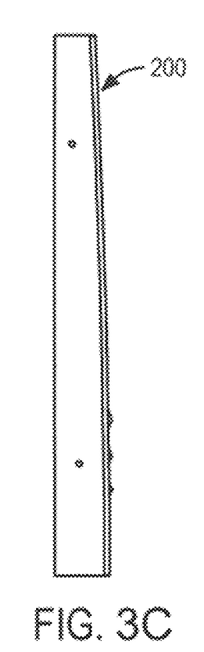
FIG. 3C is a back view of the rod stomp shield cover of FIG. 3 according to one embodiment of the invention.
Figure 3D:
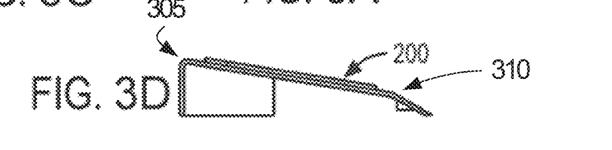
FIG. 3D is a left end view of the rod stomp shield cover of FIG. 3 according to one embodiment of the invention.
Figure 3E:
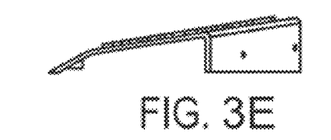
FIG. 3E is a right end view of the rod stomp shield cover of FIG. 3 according to one embodiment of the invention.

FIGS. 3-3E illustrate the shield cover 200 in further detail. In particular, FIG. 3 is a perspective view of the shield cover 200, FIG. 3A is a top view of the shield cover 200, FIG. 3B is a front view of the shield cover 200, FIG. 3C is a back view of the shield cover 200, FIG. 3D is a left end view of the shield cover 200 and FIG. 3E is a right end view of the shield cover. It will be appreciated that the shield cover 200 shown in FIGS. 3-3E illustrate one exemplary configuration of the shield cover 200 and that variations can be made to the design as described herein.

In one particular embodiment of the shield cover, the length from end to end of the shield cover is 24.0 inches, the radius of curvature of the outer face is 75.18 degrees. In the embodiment shown in 3C, the height at the first end is 2.45 inches and the height at the second end is 1.80 inches. As shown in FIG. 3D, the length of the second sloped surface is 8.95 inches and has an angle of 9.34 degrees, the first sloped surface is at a 29.62 degree angle, and the total width of the end is 10.43 inches. As shown in FIG. 3D, the cover may further include curved transition surfaces 305, 310. In one embodiment, the first transition surface has a 0.25 inch radius and the second transition surface has a 1.0 inch radius. As shown in FIGS. 3D and 3E, the width of the second end is 6.5 inches and distance between the second transition surface and the second end is 4.95 inches. FIG. 3F is a detailed view of optional openings 350 provided in the first sloped surface 250. As shown in FIGS. 3D and 3F, the openings 350 may form an engaging surface to releasably engage with the rod protector 210. In one embodiment, the radius of the opening is 0.50 inches, and it is positioned 0.77 inches from the end of the first sloped surface 250. Optionally, the openings may include a screw, bolt or other fastening means 355 to engage with the rod protector 210. It will be appreciated that the dimensions and specifications are exemplary and that alternative dimensions may be used for the shield cover 200.

Figure 4:
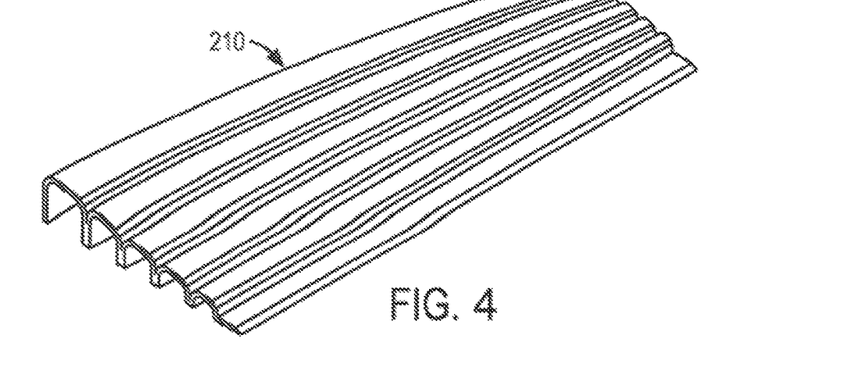
FIG. 4 is a perspective view of a rod stomp shield base according to one embodiment of the invention.
Figure 4A:
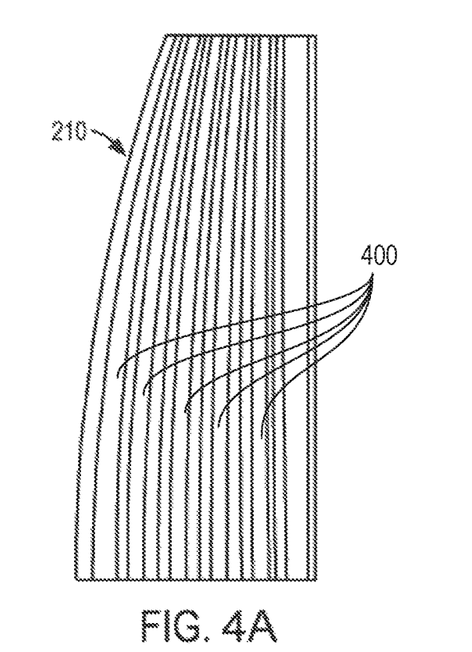
FIG. 4A is a top view of the rod stomp shield base of FIG. 4 according to one embodiment of the invention.
Figure 4B:
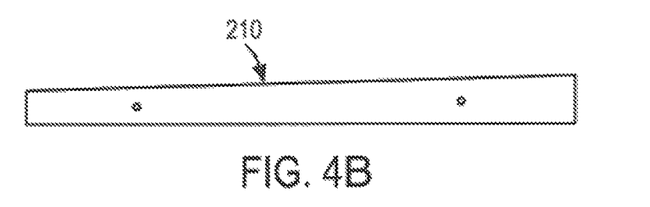
FIG. 4B is a back view of the rod stomp shield base of FIG. 4 according to one embodiment of the invention.
Figure 4C:
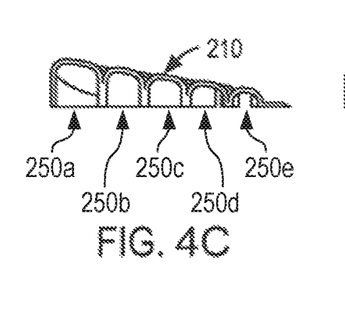
FIG. 4C is a left end view of the rod stomp shield base of FIG. 4 according to one embodiment of the invention.
Figure 4D:
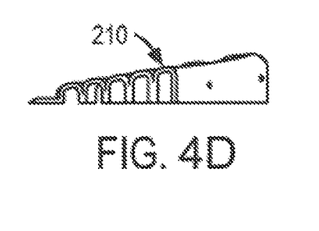
FIG. 4D is a right end view of the rod stomp shield base of FIG. 4 according to one embodiment of the invention.

FIGS. 4-4E illustrate the rod protector 210 in further detail. In particular, FIG. 4 is a perspective view of the rod protector 210, FIG. 4A is a top view of the rod protector, FIG. 4B is a back view of the rod protector, FIG. 4C is a left end view of the rod protector, and FIG. 4D is a right end view of the rod protector. It will be appreciated that the shield cover 200 shown in FIGS. 3-3E illustrate one exemplary configuration of the shield cover 200 and that variations can be made to the design as described herein.

In one particular embodiment of the rod protector, the length of the rod protector is 24.0 inches, and the width at the left end is 10.4347 inches and the width at the right end is 6.5007 inches. The height at the right end of the rod protector may be 2.16 inches and the height at the left end may be 1.5604 inches. As shown in FIGS. 4A, 4C and 4D, the rod protector is designed to include several openings 220 for receiving the fishing rods. As shown in FIG. 4A, in the top view, the plurality of openings are formed by a plurality of ridges 400 (high and low surfaces with an elongate wall connecting a high surface to the low surface). In some embodiments, the ridges extend all the way down to the bottom of the rod protector; however, it will be appreciated that the ridges need only partially extend down to form the openings. As shown in FIGS. 4C and 4D, the width or diameter of the openings varies from the right end to the left end. Similarly, the height of the openings varies from the back end to the front end. For example, a first opening 250a may have a width of 1.879 inches at the back end of the rod protector, a second opening 250b adjacent the first opening has a width of 1.4558 inches, a third opening 250c adjacent the second opening has a width of 1.4558 inches, a fourth opening 250d adjacent the third opening has a width of 1.4558 inches and a fifth opening 250d adjacent the fourth opening at the right end of the rod protector has a width of 1.1190 inches. In an alternative embodiment, each of the openings may have the same width at the left end. As explained above, the width of the openings may vary from one end to the other end such that the width of the first, second, third, fourth and fifth openings at the right end may be about 0.65 inches each. In an alternative embodiment, the width of the openings at the right end may differ from one another. It will be appreciated that the dimensions and specifications are exemplary and that alternative dimensions may be used for the rod protector 210.

Figure 5:
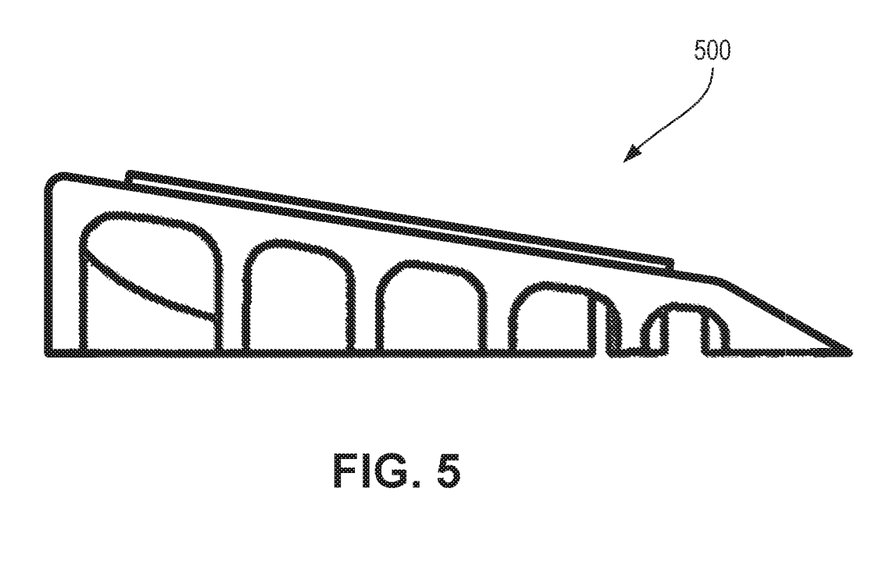
FIG. 5 is a left end view of a rod stomp shield with an integral shield cover and rod protector according to one embodiment of the invention.

FIG. 5 is a left end view of a rod stomp shield 500 with an integral shield cover and rod protector according to one embodiment of the invention. The shield cover and rod protector are integral with one another so that there is only one component to the rod stomp shield 500 that both protects the fishing rods and provides a safety surface that reduces or prevents slipping.

Other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A fishing rod shield comprising:
a rod protector comprising a plurality of ridges with lower interior surfaces and upper external surfaces, a plurality of downwardly oriented concave openings defined by the lower interior surfaces of the plurality of ridges, the downwardly oriented concave openings having closed upper ends and open lower ends, wherein the open lower ends are bounded by a surface of the vessel which extends across the open lower ends of the plurality of downwardly oriented concave openings when the rod protector is mounted thereon, the upper external surfaces of the plurality of ridges defining convex shaped portions, wherein the plurality of openings are configured for partially receiving one or more fishing rods and removing the one or more fishing rods; and
a cover comprising a bottom surface, a top surface, and a first side and a second side opposite the first side, wherein the bottom surface of the cover is engaged with the convex shaped portions defined by the upper external surfaces of the plurality of ridges of the rod protector, and wherein the first side is taller than the second side and the top surface of the cover comprises a safety surface such that a fisherman can safely step on the cover.

2. The fishing rod shield of claim 1, wherein the safety surface comprises an anti-slip surface.

3. The fishing rod shield of claim 1, wherein the safety surface comprises a quick-dry surface.

4. The fishing rod shield of claim 1, wherein the cover is releasably locked to the rod protector.

5. The fishing rod shield of claim 1, wherein the cover is engaged with the rod protector via an interference fit.

6. A fishing vessel comprising:
a fishing rod shield, the fishing rod shield comprising:
a rod protector comprising a plurality of ridges with lower interior surfaces and upper external surfaces, a plurality of downwardly oriented concave openings defined by the lower interior surfaces of the plurality of ridges, the downwardly oriented concave openings having closed upper ends and open lower ends, wherein the open lower ends are bounded by and a surface of the vessel which extends across the open lower ends of the plurality of downwardly oriented concave openings when the rod protector is mounted thereon, the upper external surfaces of the plurality of ridges defining convex shaped portions, wherein the plurality of openings are configured for partially receiving one or more fishing rods and removing the one or more fishing rods; and
a cover at least partially surrounding the rod protector, the cover having comprising a bottom surface and a top surface, a first side and a second side opposite the first side, the bottom surface of the cover engaged with the convex shaped portions defined by the upper external surfaces of the plurality of ridges, wherein the first side is taller than the second side, and wherein the top surface of the cover comprises a safety surface so that individuals can safely step on the cover.

7. The fishing vessel of claim 6, wherein the safety surface comprises an anti-slip surface.

8. The fishing vessel of claim 6, wherein the safety surface comprises a quick-dry surface.

9. The fishing vessel of claim 6, wherein the fishing rod shield is located at a front of the fishing vessel.

10. The fishing vessel of claim 6, wherein the fishing rod shield is located at a rear of the fishing vessel.

11. The fishing vessel of claim 6, wherein the fishing rod shield is a first fishing rod shield and further comprising a second fishing rod shield, the first fishing rod shield positioned at a left of the fishing vessel and the second fishing rod shield positioned at a right of the fishing vessel.

\* \* \* \* \*